US010756603B2

(12) United States Patent
Bejcek

(10) Patent No.: US 10,756,603 B2
(45) Date of Patent: Aug. 25, 2020

(54) INTERNAL COMBUSTION ENGINE WITH WIRELESS COMMUNICATIONS DEVICE

(71) Applicant: Honda Motor Co., Ltd., Tokyo (JP)

(72) Inventor: Andrew Bejcek, Chapel Hill, NC (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/156,094

(22) Filed: Oct. 10, 2018

(65) Prior Publication Data

US 2020/0060077 A1 Feb. 27, 2020

Related U.S. Application Data

(63) Continuation-in-part of application No. 16/113,653, filed on Aug. 27, 2018.

(51) Int. Cl.
| | |
|---|---|
| *H02K 11/35* | (2016.01) |
| *F02N 11/08* | (2006.01) |
| *A01D 34/00* | (2006.01) |
| *B60L 50/30* | (2019.01) |
| *A01D 34/68* | (2006.01) |
| *A01D 101/00* | (2006.01) |

(52) U.S. Cl.
CPC .......... *H02K 11/35* (2016.01); *A01D 34/006* (2013.01); *A01D 34/68* (2013.01); *B60L 50/30* (2019.02); *F02N 11/0807* (2013.01); *A01D 2101/00* (2013.01); *F02N 2300/304* (2013.01)

(58) Field of Classification Search
CPC ...... H02K 11/35; A01D 34/006; A01D 34/68; A01D 2101/00; B60L 50/30; F02N 2300/304
USPC ....................................... 701/101; 123/185.3
See application file for complete search history.

(56) References Cited

U.S. PATENT DOCUMENTS

| | | | |
|---|---|---|---|
| 5,070,686 | A | 12/1991 | Isaka et al. |
| 5,392,753 | A | 2/1995 | Burson et al. |
| 5,563,774 | A | 10/1996 | Welsch |
| D468,751 | S | 1/2003 | Neeley et al. |
| 6,675,562 | B2 | 1/2004 | Lawrence |
| 6,864,606 | B2 | 3/2005 | Rose, Sr. |
| 6,987,328 | B2 | 1/2006 | Osborne |
| 9,127,658 | B2 | 9/2015 | Koenen et al. |
| 9,737,068 | B1 | 8/2017 | Lytle, Jr. |
| 2005/0150281 | A1 | 7/2005 | Schroeder et al. |
| 2005/0228557 | A1 | 10/2005 | Swan |
| 2006/0186875 | A1 | 8/2006 | Schroeder et al. |

(Continued)

FOREIGN PATENT DOCUMENTS

| | | | | |
|---|---|---|---|---|
| JP | 2006226257 A | 8/2006 | | |
| WO | WO-2008009244 A1 | * | 1/2008 | ............. G01D 21/00 |

OTHER PUBLICATIONS

International Search Report and Written Opinion for PCT/US19/48285, dated Nov. 13, 2019. 10 pages.

*Primary Examiner* — Mahmoud Gimie
(74) *Attorney, Agent, or Firm* — Armstrong Teasdale LLP

(57) ABSTRACT

A power tool is provided. The power tool includes an internal combustion engine and a wireless communications device coupled to the internal combustion engine. The internal combustion engine includes an ignition coil assembly and a flywheel. The wireless communications device is coupled adjacent to either the flywheel or to the ignition coil assembly. The wireless communications device receives power wirelessly from the internal combustion engine only when the internal combustion engine is operating.

20 Claims, 5 Drawing Sheets

(56) References Cited

U.S. PATENT DOCUMENTS

| | | | |
|---|---|---|---|
| 2007/0182251 A1* | 8/2007 | Miyashita | F01M 11/12 307/10.6 |
| 2007/0204833 A1* | 9/2007 | Miyashita | F01M 11/12 123/406.53 |
| 2009/0064957 A1* | 3/2009 | Grybush | B60R 25/04 123/179.28 |
| 2009/0126686 A1 | 5/2009 | Sugiyama et al. | |
| 2010/0095932 A1* | 4/2010 | Nakauchi | F02P 1/086 123/406.18 |
| 2014/0042876 A1 | 2/2014 | Brockerhoff et al. | |
| 2014/0266659 A1 | 9/2014 | Dwyer et al. | |
| 2014/0266664 A1 | 9/2014 | Dwyer et al. | |
| 2015/0006025 A1 | 1/2015 | Rhoades et al. | |
| 2016/0047349 A1* | 2/2016 | Ayusawa | F02P 1/083 123/406.23 |
| 2017/0170773 A1* | 6/2017 | Donolo | H02K 11/21 |
| 2017/0347521 A1 | 12/2017 | Tjernberg et al. | |
| 2018/0068493 A1 | 3/2018 | Russ et al. | |
| 2018/0143634 A1 | 5/2018 | Ott et al. | |
| 2018/0163689 A1 | 6/2018 | Bykowski et al. | |
| 2018/0238256 A1 | 8/2018 | Noguchi et al. | |
| 2018/0263182 A1 | 9/2018 | Albinger et al. | |
| 2019/0178219 A1 | 6/2019 | Koenen | |
| 2019/0257280 A1* | 8/2019 | Andersson | F02B 63/02 |

* cited by examiner

INTERNAL COMBUSTION ENGINE WITH WIRELESS COMMUNICATIONS DEVICE

CROSS REFERENCE TO RELATED APPLICATIONS

This application is a continuation-in-part and claims priority to and the benefit of the filing date of U.S. patent application Ser. No. 16/113,653, filed Aug. 27, 2018, for INTERNAL COMBUSTION ENGINE WITH IOT CONNECTIVITY DEVICE which is hereby incorporated by reference and is assigned to the assignee of the present application.

BACKGROUND

This invention relates generally to wireless communications devices, and more particularly, to internal combustion engines that include wireless connectivity and communications technology.

As the use of wireless communications technology, such as IoT technology is becoming more common for use in cooperation with power equipment, at least some known manufacturers have attempted to commercialize equipment using the technology. For example, at least some riding lawn mowers include a built-in meter in its instrument panel that includes Bluetooth wireless connectivity. Such meters transmit usage information to a remote device or to a cloud-based database. Although reliable, such wireless communications systems are generally only available on larger equipment, as such systems require a battery and a charging system.

At least some other known riding mowers include a pass-through ignition switch connector. The ignition switch connector includes a main power circuit and a switched power circuit. The wireless communications device on such equipment uses the power circuit as a power source and uses the switched power circuit to determine whether the equipment is operating. Usage data is transmitted via Bluetooth wireless connectivity to a remote device or to a cloud-based database. Again, such wireless communications systems are generally only available on larger equipment as such systems require multiple power circuits, a battery, and a charging system.

In an effort to incorporate wireless communications technology on smaller equipment, at least some manufacturers include a communications accessory that is coupled to the equipment, generally as a stick-on device, that acts as a Bluetooth-enabled hour meter. Specifically, such devices determine the engine is operating using an accelerometer to sense vibration. The information is transmitted to a remote device. Although, marketable, the use of such wireless communications accessories may be limited as the battery in such devices may require frequent replacement and/or the accelerometer may be prone to errors and/or accidental activation, such as when the mower is transported from one location to another.

BRIEF DESCRIPTION

In one aspect, a power tool is provided. The power tool includes an internal combustion engine and a wireless communications device coupled to the internal combustion engine. The internal combustion engine includes an ignition coil assembly and a flywheel. The wireless communications device is coupled adjacent to one of the flywheel and the ignition coil assembly. The wireless communications device receives power wirelessly from the internal combustion engine only when the internal combustion engine is operating.

In another aspect, an engine assembly is provided. The engine assembly includes an internal combustion engine including a rotating component, an ignition coil, a source of a magnetic field, and a wireless communications device. The wireless communications device is coupled to the internal combustion engine, such that the wireless communications device receives power wirelessly from the internal combustion engine only when the internal combustion engine is operating.

In a further aspect, a power tool is provided. The power tool includes an internal combustion engine and a wireless communications device. The internal combustion engine includes a rotating component and a source of magnetic field. The wireless communications device includes a power generation coil configured to harvest energy from the source of magnetic field only when the internal combustion engine is operating, wherein the wireless communications device receives power wirelessly from the internal combustion engine.

DETAILED DESCRIPTION

Embodiments of the present disclosure relate to power tools, including walk-behind lawnmowers, which include an internal combustion engine assembly including wireless communication devices, such as, but not limited to Internet of Things (IoT) technology. In some embodiments, the wireless communications device is received in a recessed portion of a cover coupled to an internal combustion engine. In some embodiments the cover is fabricated from a magnetically non-permeable material, such as, but not limited to, a non-magnetic material such as plastic for example. In each implementation, the internal combustion engine includes a flywheel and a magnet coupled within a cavity defined by the cover. The wireless communications device is coupled to a power generation coil that harvests energy from the internal combustion engine only when the engine is operating. The wireless communications device gathers usage data from the power tool, and transmits the data remotely without being coupled to a battery.

The embodiments described herein are exemplary and are not limited to the descriptions provided. For example, although described in conjunction with a lawnmower, the invention described herein is not limited for use with a lawnmower, and may be instead used with other power tools or power equipment that include an internal combustion engine, such as, but not limited to, snow blowers, leaf blowers, pressure washers, string trimmers, brush cutters, generators, chainsaws, water pumps, go-karts, plate compactors, tampers, powered augers, fans, and/or paint sprayers. In addition, although portions of the description are described in conjunction with an IoT device, the invention described herein is not limited for use in conjunction with an IoT device, and rather, may instead be used with any wireless communications device that enables the power tools described herein to function as described herein.

Figure 1:
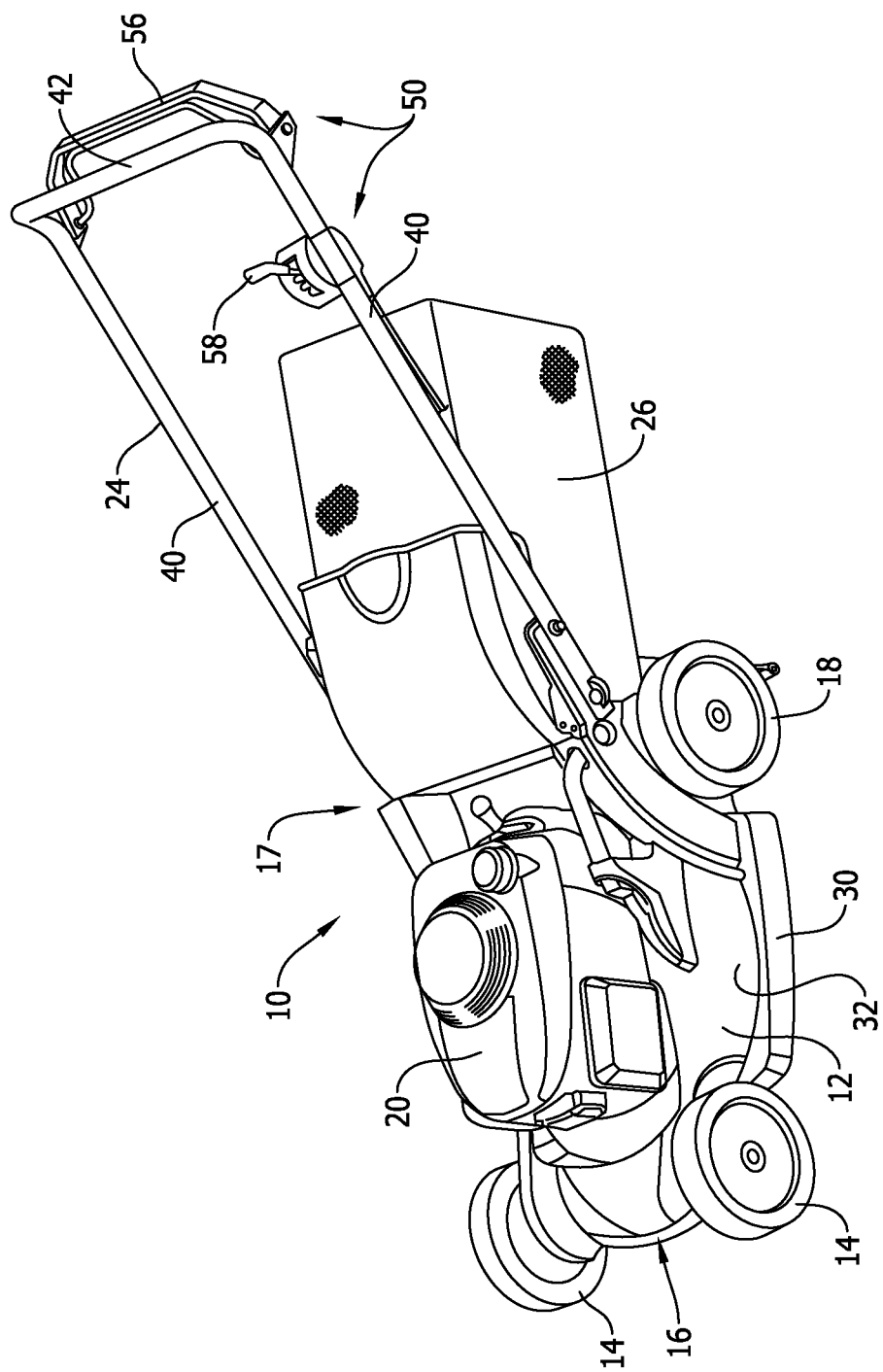
FIG. 1 is a perspective view of an exemplary walk-behind lawnmower.

FIG. 1 is a perspective view of an exemplary walk-behind lawnmower 10. In the exemplary embodiment, lawnmower 10 is a self-propelled, walk-behind mower that is used to cut vegetation. In the exemplary embodiment, mower 10 includes a cutter housing or deck 12 that defines a cavity (not shown) below it. A pair of front wheels 14 are coupled to a forward side 16 of mower 10, and a second pair of rear wheels 18 are coupled to an opposite rear side 17 of mower 10. A cutting blade (not shown) is rotatably coupled to an internal combustion engine 20 such that the cutting blade is beneath deck 12. A steering handle 24 is coupled to deck 12 such that handle 24 extends upwardly from deck 12. In the exemplary embodiment, mower 10 includes an optional collection bag 26 removably coupled to mower rear side 17.

In the exemplary embodiment, deck 12 is generally rectangular and includes a pair of opposing sides 30 that extend between forward and rear sides 16 and 17, respectively. In other embodiments, deck 12 may have any other shape that enables mower 10 to function as described herein. Deck 12 also includes an upper surface 32 and an opposite inner surface (not shown). The deck inner surface defines a portion of the cutter housing and defines a cavity (not shown) that the cutting blades are rotatably coupled within.

In the exemplary embodiment, the cutting blades are rotatably coupled to mower 10 and rotate about an axis of rotation (not shown) that is substantially vertical such that the blades rotate in generally horizontal cutting planes within the cutter housing cavity. The blades may be configured as either a single cutting element or as multiple cutting elements that each cut vegetation at the level of the cutting plane.

Handle 24 is generally U-shaped and extends upwardly and rearward from deck rear side 17. Handle 24 enables a user who walks behind mower 10 to guide and manipulate mower 10 during operation of mower 10. In the exemplary embodiment, handle 24 includes a pair of vertically-oriented support members 40 and a generally horizontally-oriented support member 42 that extends laterally between members 40 and that forms a hand grip for the user.

In the exemplary embodiment, handle 24 supports several controls 50 for the mower. For example, in the exemplary embodiment, mower 10 is self-propelled and includes a drive clutch lever 56 that is coupled to handle 24 to enable the user to selectively engage and disengage a transmission within the propulsion system. In addition, in the exemplary embodiment, a throttle lever 58 is coupled to handle 24. Throttle lever 58 enables a user to control and vary the engine speed. In addition, in the exemplary embodiment, mower 10 also includes a cutter system clutching system (not shown) that enables a user to selectively start and stop blade rotation. In one embodiment, the cutter system clutching system is similar to a known blade brake clutch (BBC) or a belt clutching pulley.

Figure 2:
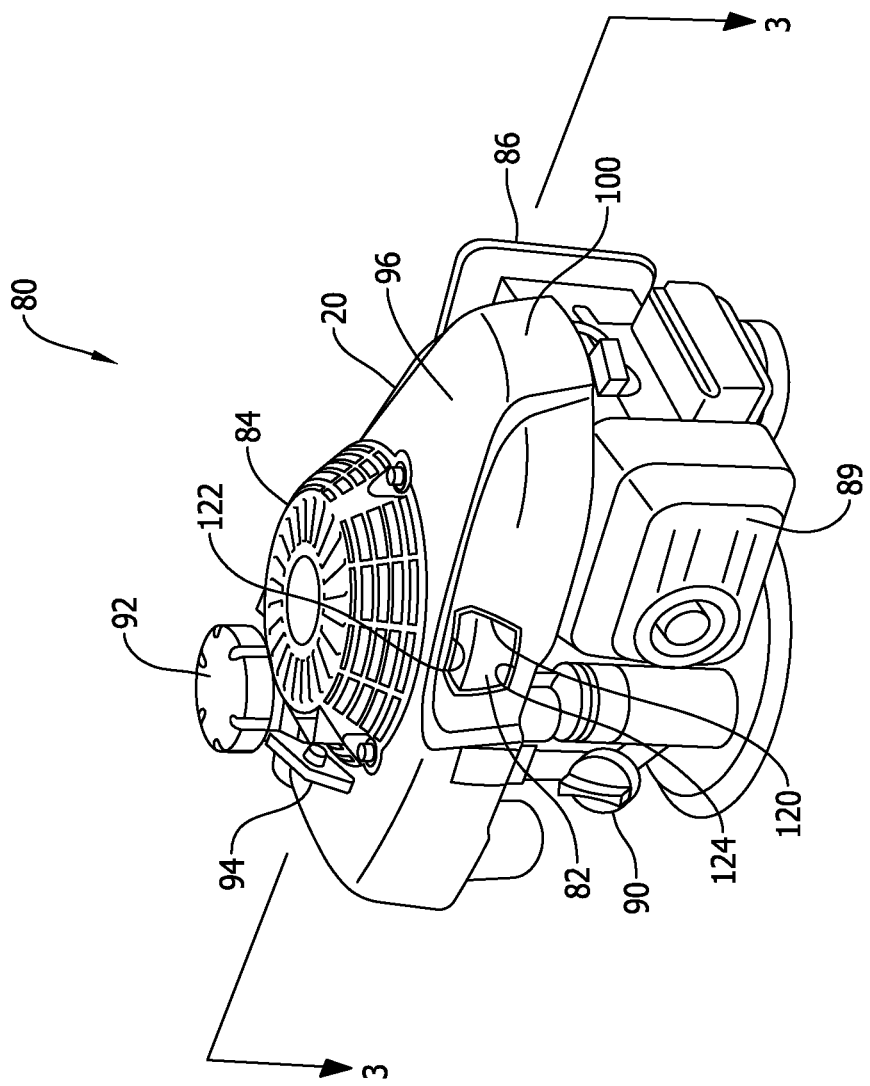
FIG. 2 is a perspective view of an exemplary internal combustion engine assembly that may be used with the lawnmower shown in FIG. 1.
Figure 3:
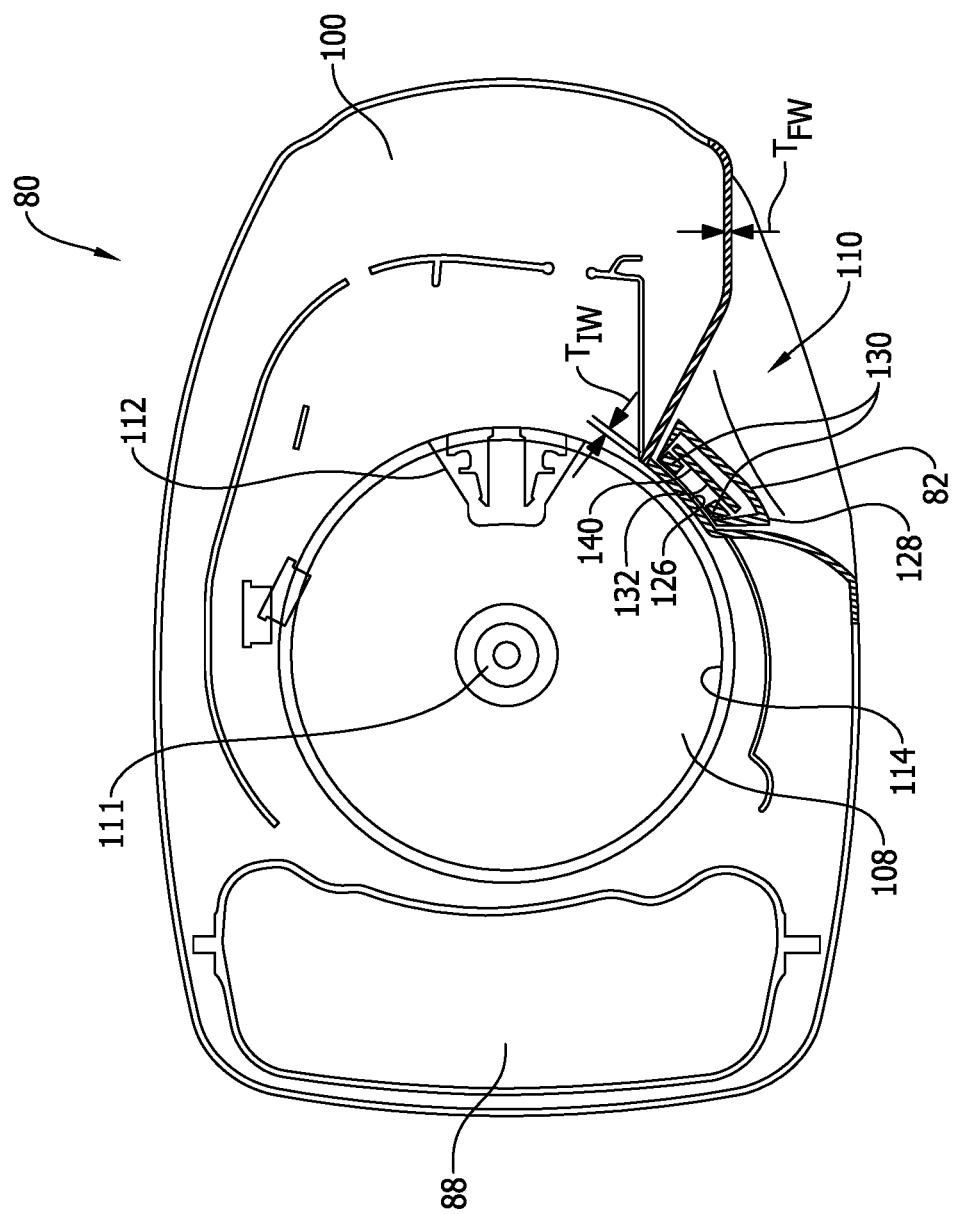
FIG. 3 is a partial cut-away plan view of the internal combustion engine assembly shown in FIG. 2.

FIG. 2 is a perspective view of an exemplary internal combustion engine assembly 80 that may be used with lawnmower 10. FIG. 3 is a partial cut-away plan view of internal combustion engine assembly 80 (shown in FIG. 2). Engine assembly 80 includes internal combustion engine 20 and a wireless communications device 82 coupled to engine 20 to monitor usage data of engine 20 as described in more detail below. In the exemplary embodiment, device 82 is an Internet of Things (IoT) connectivity device 82.

Although device 82 is described in portions herein as being an IoT device, in alternative embodiments any other wireless connectivity or communication device that enables the power tools described herein to function as described herein may be used. For example, in one alternative embodiment, device 82 does not transmit data via a cellular or WiFi internet connection, but rather device 82 maintains a peer-to-peer (P2P) connection wherein usage data is transmitted wirelessly to a phone, to enable the phone to utilize the data locally in an application in the phone. The phone application may utilize its internet connection to share this usage data with a remote database and to enable IoT functionality. In another alternative embodiment, device 82 is directly connected to the internet via a cellular modem rather than connecting via Bluetooth.

In the exemplary embodiment, engine 20 includes a fuel tank 88, an oil sump (not shown), a recoil starter assembly 84, an air cleaner assembly 86, and a muffler 89. An oil filler cap 90 provides access to the oil sump, and a fuel tank cap 92 provides access to fuel tank 88. Recoil starter assembly 84 includes a pull handle 94 and assembly 84 is coupled to engine 20 against an upper surface 96 of a cover 100. In one embodiment, engine 20 is similar to an engine used with an HRR216VLA Rotary Mower commercially available from American Honda Motor Co., Inc.

Recoil starter assembly handle 94 is connected to a starter rope (not shown) that enables a user to engage a starting mechanism (not shown) to start engine 20. In the exemplary embodiment, the starter rope is coupled to a pulley system that enables the rope to be pulled out and recoil automatically within assembly 84. More specifically, when the starter rope is pulled off the pulley and out of the engine, a recoil spring is stretched that recoils the rope onto the pulley when the user lets go of handle 94.

Pulling recoil starter assembly 84 causes a flywheel 108 to rotate with a crankshaft 111 within engine 20. Flywheel 108 is securely fixed to crankshaft 111 and includes at least one magnet 112 coupled to flywheel 108. More specifically, magnet 112 is coupled in close proximity to a radially outer edge 114 of flywheel 108 to enable magnetic energy to be formed as flywheel 108 is rotated. When enough magnetic energy is formed, an ignition module (not shown) ignites a voltage spark required for internal combustion within engine 20.

In the exemplary embodiment, cover 100 is fabricated from a magnetically non-permeable material, such as, but not limited to, a non-magnetic material such as plastic, and is formed with a recessed area 110. Recessed area 110 is sized to receive IoT device 82 therein. In one embodiment, IoT device 82 is removably coupled within area 110 in an interference fit. In another embodiment, IoT device 82 is removably coupled within recessed area 110 using mechanical hardware, including for example, but not limited to, mechanical fasteners such as screws, snaps, anchor bolts, studs, or threaded fasteners, or hook and loop material. Alternatively, any other coupling means may be used, including removable adhesives or epoxy, that enables device 82 to be removably coupled within recessed area 110. In other alternative embodiments, IoT device 82 may be permanently mounted within recessed area 110.

Recessed area 110, in the exemplary embodiment, is generally pentagon-shaped and is defined by a pair of side walls 120, an upper wall 122, a lower wall 124, and a radially inner wall 126. Alternatively, recessed area 110 may have any other shape that enables IoT device 82 and mower 10 to function as described herein. Moreover, in the exemplary embodiment, inner wall 126 is formed with a radius of curvature that substantially complements a portion of radially outer edge 114 of flywheel 108. Moreover, inner wall 126 is formed with a thickness $T_{1W}$ that is thinner than a thickness $T_{FW}$. As such, the combination of the shape of inner wall 126 and the reduced thickness $T_{1W}$ of wall 126 facilitates reducing an amount of clearance or space between device 82 and flywheel 108. Accordingly, and as explained in more detail below, the orientation of IoT device 82 relative to flywheel 108 facilitates enhancing and maximizing the magnetic field strength from magnet 112 at IoT device 82.

As described above, in the exemplary embodiment, cover 100 is fabricated from a magnetically non-permeable material and is formed with a recessed area 110. In alternative embodiments, cover 100 may be made from a metallic material or other magnetically permeable material. In such embodiments, an opening (not shown) would be defined in wall 126 to enable IoT device 82 to function as described herein. In some of such embodiments, recessed area 110 may include a removable panel (not shown) that is used to cover the opening in wall 126 when IoT device 82 is not coupled therein. In some embodiments, recessed area 110 is stylized, such as with a dot with semi-circles radiating above it, to indicate that a wireless connectivity device may be coupled therein and that mower 10 is compatible with such a device.

In the exemplary embodiment, IoT device 82 includes a housing 128 that is shaped and sized to be removably coupled within recessed area 110. A power generation or power receiving coil 130, a power conditioning circuit 132, a microcontroller (not shown), and a wireless communications interface (not shown), such as a Bluetooth module, are housed within housing 128. In the exemplary embodiment, the wireless communications interface is communicatively countable to a remote device, such as, for example a phone, a laptop, a smart watch, a server system or a web server. Moreover, the communications interface may include, for example, a wired or wireless network adapter or a wireless data transceiver for use with a mobile phone network (e.g., Global System for Mobile communications (GSM), 3G, 4G, 5G, NB-IoT, LTE Cat-M1, or EC-GSM) or other mobile data network (e.g., Worldwide Interoperability for Microwave Access (WIMAX)). Alternatively, the communications interface may transmit the data using any wireless communication protocol that enables device 82 to function as described herein, including, but not limited to, long term evolution (LTE), Wi-Fi, Bluetooth, Z-wave, Zigbee, and/or 60 Ghz, for example. In other alternative embodiments, the communications interface may transmit the data using other wireless communication protocols including, but not limited to, radio, infrared, ultrasonic, and/or near-field communication (NFC). In further embodiments, alternatively, or in addition, to enable a user to receive data, device 82 may be communicatively coupled to a hardware data link connection, such as a LAN connection, a CAN connection, an AUX connection, and/or a USB connection.

Power generation coil 130 harvests energy from flywheel magnet 112 during engine operations. More specifically, as flywheel 108 and magnet 112 are rotated during engine operation, a time variable magnetic field is present around the circumference of flywheel 108. Moreover, rotation of flywheel 108 causes magnet 112 to rotate past coil 130, and the changing magnetic field induces a voltage in coil 130. More specifically, the relative location between power generation coil 130 and flywheel 108 facilitates IoT device 82 being subjected to the maximum available transient change in magnetic field for mower 10.

In the exemplary embodiment, coil 130 is annular and is defined by a substantially circular outer edge (not shown). In alternative embodiments, due to space constraints for example, coil 130 may have any other non-circular shape, such as square or rectangular, that enables device 82 to function as described herein. Moreover, in the exemplary embodiment, coil 130 is defined by a single layer that is substantially planar. In alternative embodiments, coil 130 may include multiple layers and/or coil 130 may have a non-planar profile. For example, coil 130 may be formed with an arcuate profile that is curved to substantially match a curvature of an outer surface of flywheel 108.

The voltage induced in coil 130 powers electronics coupled to a printed circuit board (PCB) 140 in device 82 without the use of a supplemental battery. Because of the flywheel construction, power is generated in bursts when magnet 112 passes device 82. Power conditioning circuit 132 facilitates rectifying the harvested energy and maintaining a useable voltage. Because device 82 is only powered when engine 20 is operating, no additional sensors are coupled to mower 10 to determine when engine 20 is operating. The microcontroller is known and is coupled to PCB 140 to measure, store, and/or maintain a log of usage-based data, including a log of operating hours. Moreover, the microcontroller stores the usage data in non-volatile memory periodically, or when engine 20 is being shut down. The wireless communications device is known, and transmits or broadcasts usage data to a remote receiver. In other embodiments, the microcontroller may also, or in the alternative, measure engine speed, interpret sensor data, and/or store operating data. In further embodiments, the microcontroller may also, or in the alternative, measure acceleration, measure angular displacement, and/or measure angular acceleration associated with engine 20. In alternative embodiments, an accelerometer and/or a gyroscope may also be coupled within device 82.

During operation, usage-based data is transmitted from mower 10 to a remote receiver, such as a smart phone, or to a cloud-based storage. The combination of the construction of cover 100 and the relative proximity of components on mower 10, enables communications device 82 to operate, be energized, and gather usage data without a supplemental battery being coupled to device 82. Moreover, because device 82 only operates when engine 20 is operating, no additional sensors, including accelerometers, are required to determine operation of engine 20.

Figure 4:
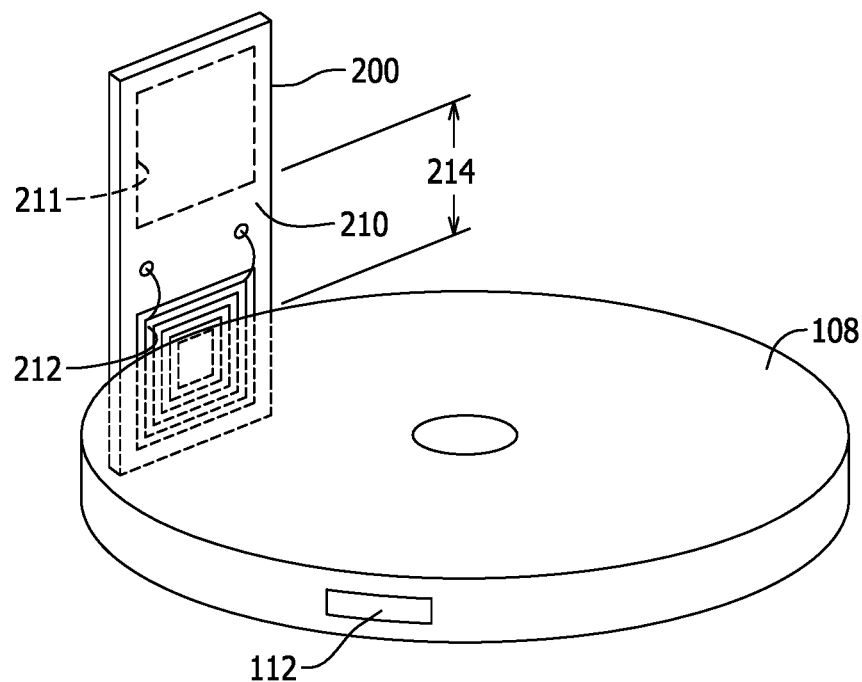
FIG. 4 is a perspective schematic view of a portion of an alternative wireless communications device that may be used with the lawnmower shown in FIGS. 2 and 3.
Figure 5:
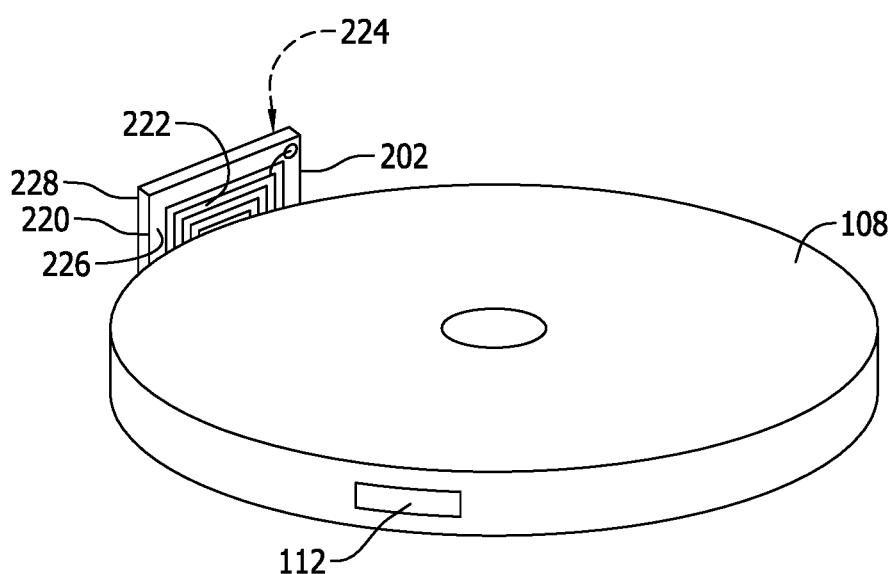
FIG. 5 is a perspective schematic view of a portion of another alternative wireless communications device that may be used with the lawnmower shown in FIGS. 2 and 3.

FIG. 4 is a perspective schematic view of a portion of an alternative wireless communications device 200 that may be used with lawnmower 10 (shown in FIG. 1). FIG. 5 is a perspective schematic view of a portion of another alternative wireless communications device 202 that may be used with lawnmower 10. Communication devices 200 and 202 are similar to device 82 (shown in FIGS. 2 and 3) and any differences will be described below. In the exemplary embodiments of FIGS. 4 and 5, each device 200 and 202 is coupled to engine 20 to monitor usage data of engine 20 as described herein. In each embodiment, the orientation of each communication device 200 and 202 relative to flywheel 108 facilitates enhancing and maximizing the magnetic field strength from magnet 112 at each respective communications device 200 and 202.

It should be noted that although devices 82, 200, and 202 are described herein as being coupled adjacent to flywheel 108, alternatively, devices 82, 200, and/or 202 may be coupled adjacent to any rotating component that includes an attached magnet and/or a rotating magnetic field. The rotating component may be part of a powered device, such as a motor shaft, or part of a non-powered, passively rotating device, such as a wheel. For example, in alternative embodiments, device 82, 200, and/or 202 may be coupled adjacent to an induction motor, a rotating shaft, and/or a magnetic sphere. Moreover, in other alternative embodiments, device 82, 200, and/or 202 may be coupled in a position to receive to a magnetic field generated from a non-permanent magnet source, such as for example, an electromagnet, and/or an electromagnetic field source such as a coil winding, an armature, or a stator winding that is part of a motor.

In the exemplary embodiment of FIG. 4, communications device 200 is coupled to a printed circuit board (PCB) 210. A power generation or power receiving coil 212, similar to coil 130 (shown in FIG. 3), is coupled to PCB 210 and to an electronics module 211 that includes a plurality of electronics, such as, for example, a power conditioning circuit, such as circuit 132 (shown in FIG. 3) a microcontroller (not shown), and a wireless communications or connectivity interface (not shown). More specifically, because of the orientation of PCB 210, only coil 212 is adjacent to flywheel 108 and electronics module 211, and more specifically, the power conditioning circuit, microcontroller, and wireless communications interface are coupled a distance 214 above flywheel 108, such that coil 212 is located closer to the engine (not shown in FIG. 4) than heat sensitive electronics. The relative location between power generation coil 212 and the electronics module 211 coupled to PCB 210 facilitates reducing an amount of heat the electronics are exposed to during engine operation.

Similarly, in the exemplary embodiment of FIG. 5, communications device 202 includes a PCB 220 in a compact configuration that may be used if space is limited and/or with flywheel cover that is fabricated from a material that enables device 202 to function without the use of a recessed area, such as area 110 (shown in FIG. 3) In such an embodiment, a power generation or power receiving coil 222, similar to coil 212, is coupled to PCB 220 and to an electronics module 224 that includes, for example, a power conditioning circuit, such as circuit 132, a microcontroller (not shown), and a wireless communications or connectivity interface (not shown). More specifically, in the embodiment of FIG. 5, coil 222 is coupled to a first side 226 of PCB 220 and the electronics module 224 including the power conditioning circuit, microcontroller, and wireless communications interface are coupled to the opposite side 228 of PCB 220.

Coils 212 and 222 may have any shape that enables respective communication devices 200 and 202 to function as described herein. Moreover, in the exemplary embodiment, coils 212 and/or 222 are each defined by a single layer that is substantially planar. In alternative embodiments, coils 212 and/or 222 may include multiple layers, and/or may be formed with non-planar profiles. Furthermore, although each coil 212 and 222 is illustrated as being generally square, coils 212 and/or 222 may be formed in any other shape that enables respective devices 200 and 202 to function as described herein.

Figure 6:
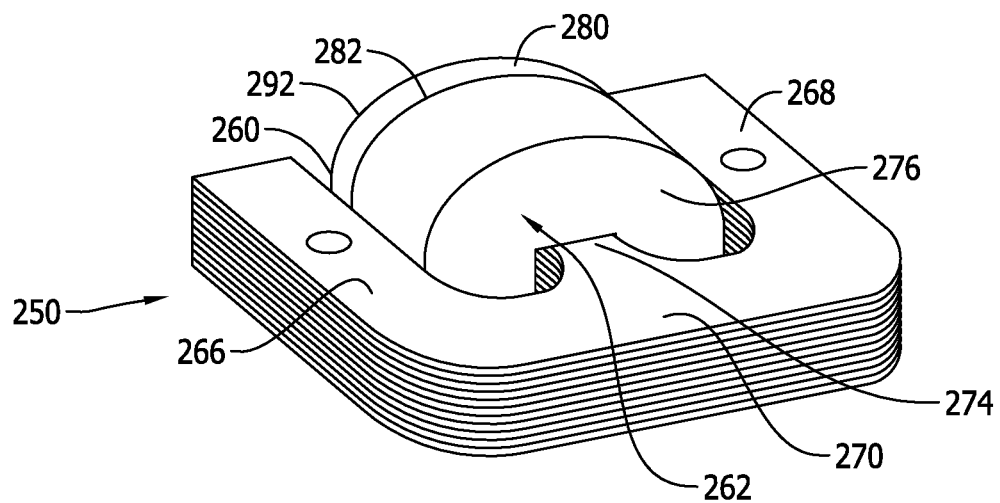
FIG. 6 is a perspective schematic view of a portion of an ignition coil assembly that may be used with the internal combustion engine shown in FIGS. 2 and 3.
Figure 7:
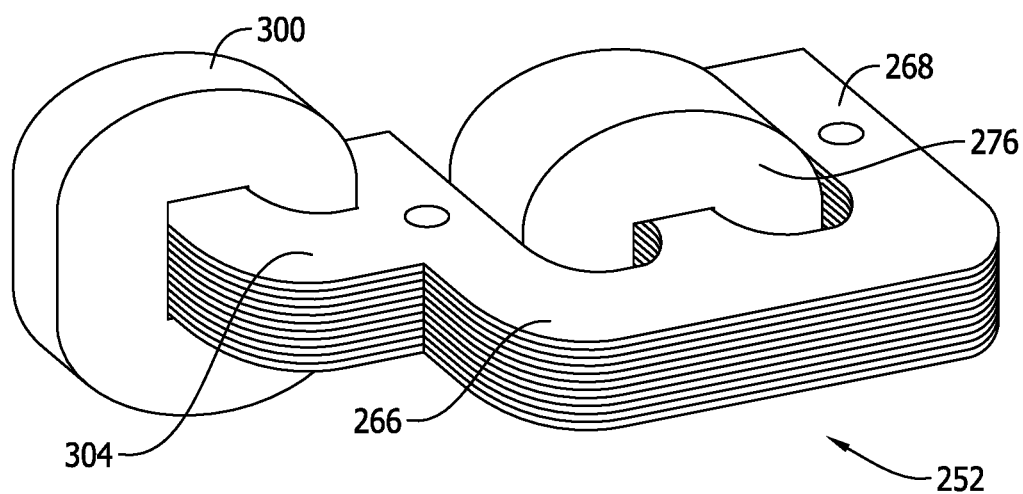
FIG. 7 is a perspective schematic view of a portion of an alternative ignition coil assembly that may be used with the internal combustion engine shown in FIGS. 2 and 3.

FIG. 6 is a perspective schematic view of a portion of an exemplary integrated ignition coil assembly 250 that may be used with internal combustion engine 80 (shown in FIGS. 2 and 3). FIG. 7 is a perspective schematic view of a portion of an alternative integrated ignition coil assembly 252 that may be used with engine 80. Within coil assembly 250, a power generation coil 260 is coupled to an existing stator/coil assembly 262. More specifically, stator/coil assembly 262 includes a pair of mounting legs 266 and 268 that extend outward from a main body portion 270. A primary magnetic circuit leg member 274 also extends outward from stator main body portion 270 such that member 274 is substantially centered between mounting legs 266 and 268. In assembly 262, an ignition coil 276 is wound about magnetic circuit leg member 274. In alternative embodiments, stator/coil assembly 262 may have any other configuration or shape that enables coil assembly 250 to function as described herein.

In the exemplary embodiment, integrated coil assembly 250 includes a power generation coil 280 coupled to an aft end 282 of ignition coil 276. More specifically, power generation coil 280 is wound about primary magnetic leg member 274 such that coil 280 is substantially concentric with respect to coil 276. Moreover, in the exemplary embodiment, electronic components (not shown) such as, but not limited to, a PCB, a power conditioning circuit, a microcontroller, and/or a wireless communications interface may be coupled to an aft end 292 of power generation coil 280 such that coil 280 is between ignition coil 276 and the electronic components. In at least one alternative embodiment, the electronic components are not coupled to power generation coil aft end 292, but instead are remote from coil 280.

In another alternative embodiment, power generation coil 280 is coupled remotely from ignition coil 276 and at least some of the electronic components are coupled to ignition coil 276. For example, in the embodiment shown in FIG. 7, a power generation coil 300 has been wound about a supplemental stator bar 304 that extends outward from one of stator mounting legs 266 or 268, rather than the power generation coil 300 being coupled against ignition coil 276. In each embodiment, power generation coils 280 and 300 harvest energy only during engine operations. The voltage induced in coils 280 and 300 powers electronics coupled thereto without the use of a supplemental battery.

The above-described mower uses an internal combustion engine coupled to a wireless communications device that is cost-effective to manufacture and assemble, and that facilitates reducing the number of components, and the complexity of components necessary to monitor usage data associated with the internal combustion engine. Moreover, the wireless communications device described herein does not receive power primarily from a battery. Furthermore, the wireless communications device described herein could be flexible and adaptable for use with equipment other than lawn mowers that includes an internal combustion engine.

Exemplary embodiments of power tools and more specifically, mower architecture are described above in detail. Although the mower architecture are herein described and illustrated in association with a walk-behind lawnmower, the invention is also intended for use on commercial walk-behind mowers. Moreover, it should also be noted that the components of the invention are not limited to the specific embodiments described herein, but rather, aspects of each component may be utilized independently and separately from other components and methods of assembly described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power tool comprising:
an internal combustion engine comprising a flywheel;
a wireless communications device coupled to said internal combustion engine such that said wireless communications device is adjacent to said flywheel, wherein rotation of said flywheel of said internal combustion engine generates a magnetic field and said wireless communications device generates power wirelessly from the magnetic field during operation of said internal combustion engine; and
a housing comprising a recessed area sized to receive at least a portion of said wireless communication device such that said wireless communication device is removably coupled to said housing, said housing further comprises an inner wall extending between said wireless communication device and said flywheel.

2. A power tool in accordance with claim 1 wherein said wireless communications device is not primarily powered by a battery.

3. A power tool in accordance with claim 1 wherein said wireless communications device comprises at least one of:
a microcontroller for at least one of measuring operating time, measuring engine speed, interpreting sensor data, storing operating time, storing operating data, and maintaining a log of operating hours;
a wireless connectivity device for broadcasting usage-based data gathered from said internal combustion engine; and
a sensor for at least one of measuring acceleration, measuring angular displacement, and measuring angular acceleration.

4. A power tool in accordance with claim 1 wherein said wireless communications device comprises a power generation coil configured to harvest energy for use in powering said wireless communications device.

5. A power tool in accordance with claim 4 wherein said wireless communications device is coupled to said flywheel such that said power generation coil is between said flywheel and a printed circuit board.

6. A power tool in accordance with claim 4 wherein said wireless communications device is coupled to said housing of said internal combustion engine and only in wireless contact with said internal combustion engine.

7. A power tool in accordance with claim 1, wherein said wireless communications device is removably coupled to said housing.

8. An engine assembly comprising:
an internal combustion engine comprising a rotating component for generating a magnetic field;
a wireless communications device coupled to said internal combustion engine, said wireless communications device generates power wirelessly from the magnetic field during operation of said internal combustion engine; and
a housing comprising a recessed area sized to receive at least a portion of said wireless communication device such that said wireless communication device is removably coupled to said housing, said housing further comprises an inner wall extending between said wireless communication device and said rotating component.

9. An engine assembly in accordance with claim 8 wherein said wireless communications device comprises:
a power generation coil configured to harvest energy from the magnetic field generated by the movement of said rotating component; and
a power conditioning circuit configured to maintain a useable voltage for said wireless communications device.

10. An engine assembly in accordance with claim 9 wherein said wireless communications device is not primarily powered by a battery.

11. An engine assembly in accordance with claim 9 wherein a source of magnetic field comprises one of a permanent magnet coupled to said rotating component and an electromagnetic field source.

12. An engine assembly in accordance with claim 9 wherein said rotating component comprises at least one of a flywheel, a rotating shaft, and a wheel.

13. An engine assembly in accordance with claim 9 wherein said wireless communications device comprises a microcontroller for at least one of measuring operating time, measuring engine speed, interpreting sensor data, storing operating time, storing operating data, and maintaining a log of operating hours.

14. An engine assembly in accordance with claim 9 wherein said wireless communications device comprises a wireless connectivity device configured to broadcast usage-based data gathered from said internal combustion engine.

15. An engine assembly in accordance with claim 9 wherein said wireless communications device comprises a power generation coil configured to harvest energy from the magnetic field for use in powering said wireless communications device.

16. An engine assembly in accordance with claim 15 wherein said wireless communications device is coupled to said rotating component such that said power generation coil is between said rotating component and a printed circuit board.

17. An engine assembly in accordance with claim 15 wherein said wireless communications device is coupled to said housing of said internal combustion engine and only in wireless contact with said internal combustion engine.

18. A power tool comprising:
an internal combustion engine comprising a rotating component for generating a magnetic field;
a wireless communications device comprising a power generation coil configured to harvest energy from the magnetic field only during operation of said internal combustion engine, wherein said wireless communications device generates power wirelessly from said internal combustion engine; and
a housing comprising a recess area oriented to receive at least a portion of said wireless communication device, said housing further comprises an inner wall extending between said wireless communication device and said rotating component.

19. A power tool in accordance with claim 18 wherein a source of the magnetic field comprises one of a permanent magnet and an electromagnetic field source, said wireless communications device is coupled to said internal combustion engine in close proximity to one of said rotating component and said electromagnetic field source to enable said power generation coil to harvest energy without being coupled to a battery.

20. A power tool in accordance with claim 18 wherein said wireless communications device comprises a power conditioning circuit configured to maintain a useable voltage for said wireless communications device, said wireless communications device is not primarily powered by a battery.

* * * * *